United States Patent Office 3,502,646
Patented Mar. 24, 1970

3,502,646
REACTIVE MONO- AND DISAZO DYESTUFFS SUITABLE FOR DYEING MODIFIED POLYPROPYLENE
Luigi Canonica, Milan, Argento Crotti, Cogliate, Milan, and Giampiero Pieri, Saronno, Milan, Italy, assignors to Aziende Colori Nazionali Affini Acna S.p.A., Milan, Italy
No Drawing. Filed July 29, 1966, Ser. No. 568,758
Claims priority, application Italy, Aug. 2, 1965, 17,464/65
Int. Cl. D06p 1/02; C09b 29/08, 31/04
U.S. Cl. 260—186        3 Claims

ABSTRACT OF THE DISCLOSURE

Dyestuffs having the general formula

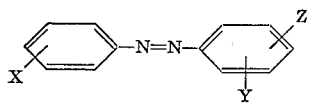

wherein X and Z are each a radical selected from the group consisting of —SO$_3$CH$_3$, alkyl, NO$_2$, halogen, carboxyl, hydrogen, alkoxy, dialkylamino, aryl, and alkylamino; Y is either the same as Z or is the radical —A—C$_6$H$_4$—R wherein R is hydrogen, —SO$_3$CH$_3$, an alkyl radical, an alkoxy radical, —NO$_2$ or halogen and A is —N=N— or —NH—; at least one of the substituents X, Y and Z representing the radical —SO$_3$CH$_3$; are particularly suitable for dyeing polypropylene modified with a basic organic dye receptivity modifier.

---

The present invention relates to a new class of reactive dyestuffs which are suitable for the dyeing of polypropylene modified with basic organic substances.

The invention also relates to a process of dyeing the modified polypropylene (obtained by extrusion and spinning of blends of polypropylene with basic nitrogenated organic substances) with the above mentioned dyestuffs.

Difficulties are known to be presented in the dyeing of polypropylene fiber which, consisting only of carbon and hydrogen atoms, is free of any polar atoms, atom groupings or radicals, which polar radicals would afford sites for chemical or physical-chemical bonds with the various classes of dyestuffs.

In order for a dyeing to be suitable for most commercial applications, it must exhibit, besides an adequate intensity, good uniformity, and high fastness to alkaline washing, to detergents, to dry cleaning and to light.

Previous attempts have been made to modify polyolefins, particularly polypropylene, either by dispersing in the polymer one or more metals having a valence at least equal to 2, generally in the form of high molecular weight organic salts, or by copolymerization with monomers which render the resulting copolymer more receptive to the dyestuffs, or alternatively, by extrusion and spinning of mixtures of the polyolefins blended with basic substances.

We have now surprisingly found a new class of dyestuffs, particularly suitable for dyeing modified polypropylene fibers, these dyestuffs being capable of being firmly bonded to the nitrogen-containing basic organic substance present in the polypropylene fiber produced by the last-mentioned modification process because of the presence in the dyestuffs of the reactive radical

—SO$_3$CH$_3$

The dyestuffs of the present invention, having the above reactive radical, have the general Formula I:

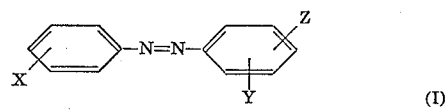

wherein X and Z are each a radical selected from the group consisting of —SO$_3$CH$_3$, alkyl, NO$_2$, halogen, carboxyl, hydrogen, alkoxy, dialkylamino, aryl and alkylamino; Y is either the same as Z or is the radical —N=N—C$_6$H$_4$—R wherein R is hydrogen, —SO$_3$CH$_3$, an alkyl radical, an alkoxy radical, —NO$_2$ or halogen: at least one of the substituents X, Y and Z representing the radical —SO$_3$CH$_3$.

Preferred dyestuffs within the above general Formula I are those having the Formula II:

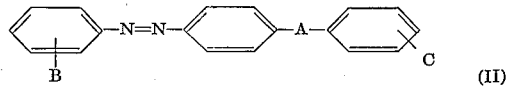

wherein A is —N=N— or —NH—, and B and C are different radicals selected from the group consisting of —SO$_3$CH$_3$, H and a dialkylamino group, one of B and C being —SO$_3$CH$_3$ radical

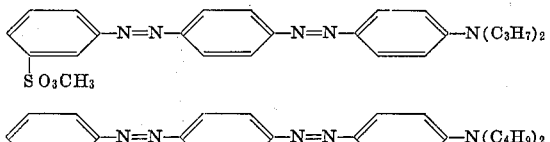

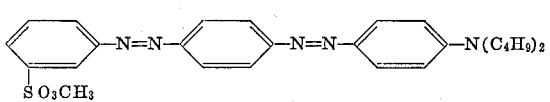

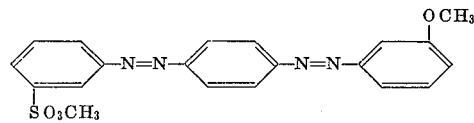

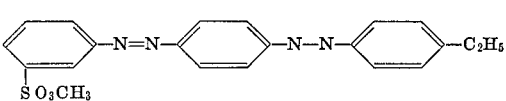

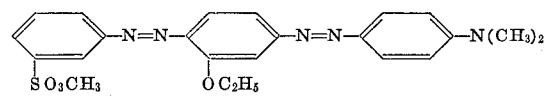

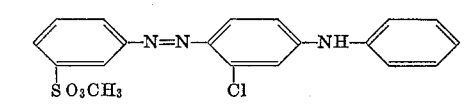

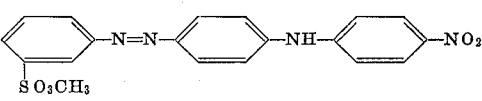

The modified polyolefin fibers are prepared by extrusion of the propylene polymer blended with organic modifiers of basic nature. The amount (by weight) of the basic nitrogen organic additive present in the polypropylene fiber is between 0.05 and 15% preferably between 0.05 and 5%. The basic additive consists essentially of an organic compound containing one or more tertiary nitrogen atoms and optionally one or more secondary nitrogen atoms. The additive may also contain —OH groups and may be optionally present in the fiber in a cross-linked form, e.g. in epoxy form, which improves the stability and the uniformity of the distribution in the polyolefin filament. The octodecylamine+epichlorohydrin+piperazine polycondensates, and in particular the dicyclohexylhexamethylenediamine + epichloridrine+piperazine polycondensates, are particularly suitable.

The present invention also provides a process for the dyeing of polypropylene material, modified with basic organic substances as described above, with an azo dyestuff of the general formula I. By this process intense dyeings characterized by high fastness particularly to wet treatments, as well as to washing with soap, to dry cleaning with trichloroethylene and perchloroethylene, and to sublimation, are obtained.

In accordance with one alternative process of the invention, the dyeing is carried out in an aqueous bath, at atmospheric pressure, at a temperature of 95–100° C. for times of between about 30 and 90 minutes. The commonly used dispersing agents may be optionally added to the dye bath. In addition, the dye bath may contain from about 0.1% to 5% (by weight of the dyeing bath) of an organic or inorganic acid substance, such as, for example, formic acid, acetic acid, sulfuric acid, hydrochloric acid, etc.

According to an alternative process, the dyestuffs can be applied under pressure (906.7 to 2026.16 mm. Hg), at 105–130° C., preferably at 110–125° C., for times of between about 30 and 90 minutes.

Yet another alternative dyeing process is to apply according to known techniques the dyestuff by foulard impregnation in the presence of auxiliary substances (such as tiodiglycol, glycerol, etc.), followed by a development at 120° C. for a few minutes.

Optionally, auxiliary dispersing agents (such as the condensation products of ethyleneoxide and aliphatic alcohols) which do not delay the exhaustion of the bath may also be used.

The dyed or printed materials are then preferably subjected to a soaping treatment at the boiling point of the soap solution for about 30 minutes.

The following examples are presented to further illustrate the present invention without in any way limiting the scope thereof. Unless otherwise indicated, all parts and percentages are by weight.

EXAMPLE 1

3.53 parts of 4-anilido-azobenzene-3'-sulfonic acid dissolved in 35 parts by volume of phosphorous oxychloride, were heated to 80–95° C., and then added, at this temperature, with stirring, within about 30 minutes, to 4.17 parts of phosphorous pentachloride. At the end of the addition, the reaction mixture was kept under agitation for 4 hours at 90–95° C. Then it was cooled to room temperature and discharged under agitation into about 400 parts by volume of icewater. After about 2 hours agitation at 0° C., the mixture was filtered and washed to neutral pH with icewater. Then the filter cake, partially dried by suction on the filter, was introduced into 20 parts by volume of methyl alcohol, cooled to 0° C., whereupon 1.7 parts by volume of 36° Bé. NaOH were added thereto.

After agitation for 6 hours at 0° C. and standing for one night, the mixture was filtered, washed with boiling water until the wash water was colorless, then dried at 60° C.

The product obtained was a yellow powder, insoluble in water and soluble in organic solvents, and having the structure:

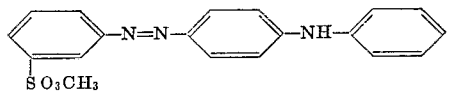

It dyed polypropylene fiber modified with about 1% of basic organic additive an intense and fast yellow shade.

EXAMPLE 2

0.31 part of the sodium salt of the product obtained by coupling of the diazo of p-aminobenzenesulfonic acid with N,N-dimethylaniline, was dissolved in 40 parts by volume of POCl$_3$ and then chlorosulfonated with 4.17 parts of PCl$_5$ as described in Example 1. Except that 30 parts by volume of methyl alcohol were used, the finishing procedure described in Example 1 was followed.

The product obtained was a brown-violet powder, insoluble in water and soluble in organic solvents and having the structure:

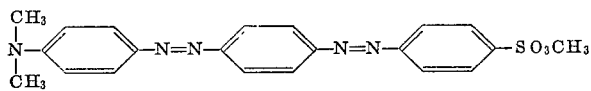

It dyed polypropylene fibed modified with 1% of basic organic additive in an intense and fast brown orange shade.

EXAMPLE 3

0.05 part of the dyestuff prepared in Example 1 was dissolved in 10 parts by volume of acetone. 1 part by volume of the condensation product of one mol of oleic alcohol with 18 mols of ethylene oxide was added, and the acetone was then evaporated at 60–70° C.

The residue was diluted to 200 parts by volume with distilled water, and 3 parts of a modified polypropylene fabric, containing 1% of di-cyclohexylhexamethylenediamine + epichlorohydrin + piperazine polycondensate, were introduced. Then the mixture was boiled for 1 hour, followed by treatment with a 5% soap solution for one-half hour at the boiling point.

A fabric dyed in a very intense yellow shade with very good general fastness was obtained.

EXAMPLE 4

0.05 part of the dyestuff prepared in Example 2 was dispersed as described in Example 3. 2 parts by volume of 5% acetic acid were added to the dispersion and 3 parts of a modified polypropylene fabric containing 1% of the dicyclohexylhexamethylenediamine + epichlorohydrin+piperazine polycondensate were introduced. The dispersion was heated at the boiling point for 1 hour.

The soaping treatment was carried out as in Example 3.

A fabric dyed in an intense brown-orange shade having very high general fastness was obtained.

Variations can, of course, be made without departing from the spirit and scope of the invention.

Having thus described our invention, what we desire to secure and hereby claim by Letters Patent is:

1. A dyestuff having the formula:

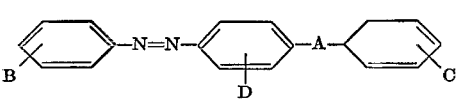

wherein A is —N=N or —NH—, B and C are different radicals selected from the group consisting of —SO$_3$CH$_3$, H, dialkylamino wherein the alkyl has 1 to 4 carbon atoms, —OCH$_3$, —C$_2$H$_5$ and —NO$_2$, one of B and C being an SO$_3$CH$_3$ radical, and D is H, —OC$_2$H$_5$ or Cl.

2. The dyestuff of claim 1 which has the structure:
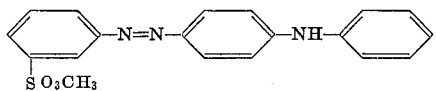
3. The dyestuff of claim 1 which has the structure:
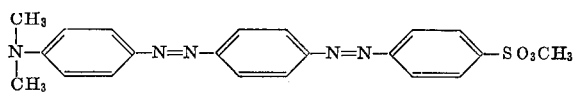
References Cited
UNITED STATES PATENTS
2,034,668   3/1936   Reindel et al. _____ 260—205
FOREIGN PATENTS
604,064   8/1960   Canada.
CHARLES B. PARKER, Primary Examiner
D. M. PAPUGA, Assistant Examiner
U.S. Cl. X.R.
8—41, 55; 260—205, 206

UNITED STATES PATENT OFFICE
CERTIFICATE OF CORRECTION

Patent No. 3,502,646                                  March 24, 1970

Luigi Canonica et al.

It is certified that error appears in the above identified patent and that said Letters Patent are hereby corrected as shown below:

Column 2, line 30, "C being" should read -- C being an --; lines 45 to 48, the formula should appear as shown below:

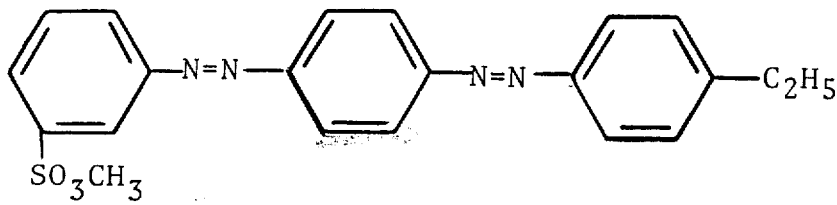

Column 3, line 40, "tiodiglycol" should read -- thiodiglycol --.
Column 4, line 28, "fibed" should read -- fiber --; line 70, "-N=N" should read -- -N=N- --.

Signed and sealed this 5th day of January 1971.

(SEAL)
Attest:

EDWARD M. FLETCHER, JR.                            WILLIAM E. SCHUYLER, JR.
Attesting Officer                                        Commissioner of Patents